United States Patent [19]

Suh

[11] Patent Number: 5,786,867

[45] Date of Patent: Jul. 28, 1998

[54] VIDEO CONTROL SIGNAL GENERATOR FOR PROCESSING DIGITAL VIDEO SIGNAL

[75] Inventor: Inh-seok Suh, Suwon, Rep. of Korea

[73] Assignee: Samsung Aerospace Industries, Ltd., Kyongsangnam-do, Rep. of Korea

[21] Appl. No.: 615,967

[22] Filed: Mar. 14, 1996

[30] Foreign Application Priority Data

Mar. 20, 1995 [KR] Rep. of Korea .................... 1995 5786

[51] Int. Cl.$^6$ ...................................... H04N 5/08
[52] U.S. Cl. ...................... 348/521; 348/500; 348/524
[58] Field of Search ...................... 348/213, 469, 348/141, 521, 500, 508, 512, 524, 525; 386/34; H04N 5/08, 3/24

[56] References Cited

U.S. PATENT DOCUMENTS

| | | | |
|---|---|---|---|
| 3,777,063 | 12/1973 | Meacham | 348/524 |
| 4,631,586 | 12/1986 | Gennetten et al. | 348/495 |
| 4,845,563 | 7/1989 | Kishi et al. | 348/548 |
| 4,958,227 | 9/1990 | Wan | 348/523 |
| 5,309,236 | 5/1994 | Park | 348/530 |
| 5,486,868 | 1/1996 | Shyu et al. | 348/524 |

*Primary Examiner*—Mark R. Powell
*Assistant Examiner*—Ronald D. House
*Attorney, Agent, or Firm*—Finnegan, Henderson, Farabow, Garrett & Dunner, L.L.P.

[57] ABSTRACT

A system for generating a video control signal to process a video signal associated with a video composite signal. The video composite signal has horizontal and vertical driving signal, each having one or more pulses. The system comprises a counter for counting the number of the pulses of respective one or more of the horizontal and vertical driving signals, and a flip-flop, which is coupled to the counter, for generating a blanking signal based on the result of the counting.

10 Claims, 8 Drawing Sheets

5,786,867

VIDEO CONTROL SIGNAL GENERATOR FOR PROCESSING DIGITAL VIDEO SIGNAL

BACKGROUND OF THE INVENTION

1. Field of the Invention

The present invention relates to a video control signal generator, and more particularly, to a video control signal generator for processing a digital video signal.

2. Description of the Prior Art

FIG. 1 is a block diagram of a conventional video signal processor. The video signal processor includes an analog video circuit 100, a control signal converter 200, and a digital video circuit 300. The control signal converter 200 converts a horizontal driving signal HD and a vertical driving signal VD received from the analog video circuit 100 into a horizontal blanking signal HBLK and a vertical blanking signal VBLK, respectively, and delays the timing of a pixel clock pulse PCK received from the analog video circuit 100 to make it suitable for digital video signal processing in the digital video circuit 300.

The reason for the forementioned conversion will be described with reference to accompanying drawings as follows. FIGS. 2A, 2B, 2C and 2D show waveforms representing signals processed in the video signal processor of FIG. 1: FIG. 2A represents a composite video signal; FIG. 2B a video signal; FIG. 2C a horizontal sync signal HSYNC; and FIG. 2D the horizontal driving signal HD. Further, FIGS. 3A, 3B, and 3C represent a vertical sync signal VSYNC, the vertical driving signal VD and a field signal, respectively.

Referring to FIG. 2A, a (NTSC) composite video signal provided from the analog video circuit 100 has a horizontal blanking time period t (10 μsec). This blanking period t is composed of a front porch period $t_1$, a back porch period t2, and the horizontal sync signal HSYNC (refer to FIG. 2C). Similarly, the composite video signal has a vertical blanking time period, which includes the vertical driving signal VD having a pulse width of 9 hd (refer to FIG. 3B) and a video-signal-free 11hd period (refer to FIG. 5B) during which no video signal is present.

Since the porch periods $t_1$ and $t_2$ as well as the video-signal-free 11hd period are not needed for processing the digital video signal, a separate video control signal, i.e., horizontal blanking signal HBLK or vertical blanking VBLK, is required to process the digital video signal. hd may refer to a time period representing a cycle of the horizontal driving signal HD, as shown in FIG. 8B. Since the digital video circuit 300 (FIG. 1) uses only the video signal portion of the composite video signal of FIG. 2A, to process the video signal portion of the composite video signal, a separate video control signal namely, i.e., the blanking signal HBLK or VBLK, becomes necessary.

However, the analog video circuit 100 of FIG. 1 cannot produce such a blanking signal to be used as the video control signal. To produce such a blanking signal, the control signal converter 200 of FIG. 1 employs first and second multivibrators 50 and 54 (shown in FIG. 4). The first multivibrator 50 adjusts the pulse width of the horizontal driving signal HD according to the charge/discharge time (or RC constant) of a resistor 51 and a capacitor 52 connected to the first multivibrator 50, to generate a desired horizontal blanking signal HBLK having a pulse width of 10 μsec for processing the digital video signal, as shown in FIG. 5A. The second multivibrator 54 adjusts the pulse width of the vertical driving signal VD according to the charge/discharge time (or RC constant) of a resistor 55 and a capacitor 56 connected to the second multivibrator 54, to generate a desired vertical blanking signal VBLK having a pulse width of 20hd, as shown in FIG. 5B.

As described above, the conventional video signal processor necessitates the control signal converter 200 (FIG. 1), which employs the first and second multivibrators 50 and 54 to generate the video control signals (i.e., horizontal and vertical blanking signals), to process only the video signal portion (FIG. 2B) of the composite video signal (FIG. 2A) in the digital video circuit 300 (FIG. 1). However, the conventional video signal processor has drawbacks in that the characteristics of the resistor and capacitor in the control signal converter vary with temperature, affecting the charge/discharge time constant of the resistor and capacitor. Accordingly, the pulse width of the video control signal varies, which makes it difficult to generate a video control signal having a precise time interval. Further, the properties of resistors and capacitors vary from components to components, requiring adjustments which in turn impedes mass production.

SUMMARY OF THE INVENTION

To solve the above-described problems, it is an object of the present invention to provide a video control signal having a precise time interval.

To accomplish the above object, the invention, as embodied and broadly defined herein, provides a system for generating a video control signal to process a video signal associated with a video composite signal. The video composite signal has horizontal and vertical driving signal, each having one or more pulses. The system comprises a counter for counting the number of the pulses of respective one or more of the horizontal and vertical driving signals, and a flip-flop coupled to the counter for generating a blanking signal based on the result of the counting.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Reference will now be made in detail to the present preferred embodiments of the invention, examples of which are illustrated in the accompanying drawings. Whatever possible, the same reference numbers will be used throughout the drawings to refer to the same or like parts.

Figure 6:
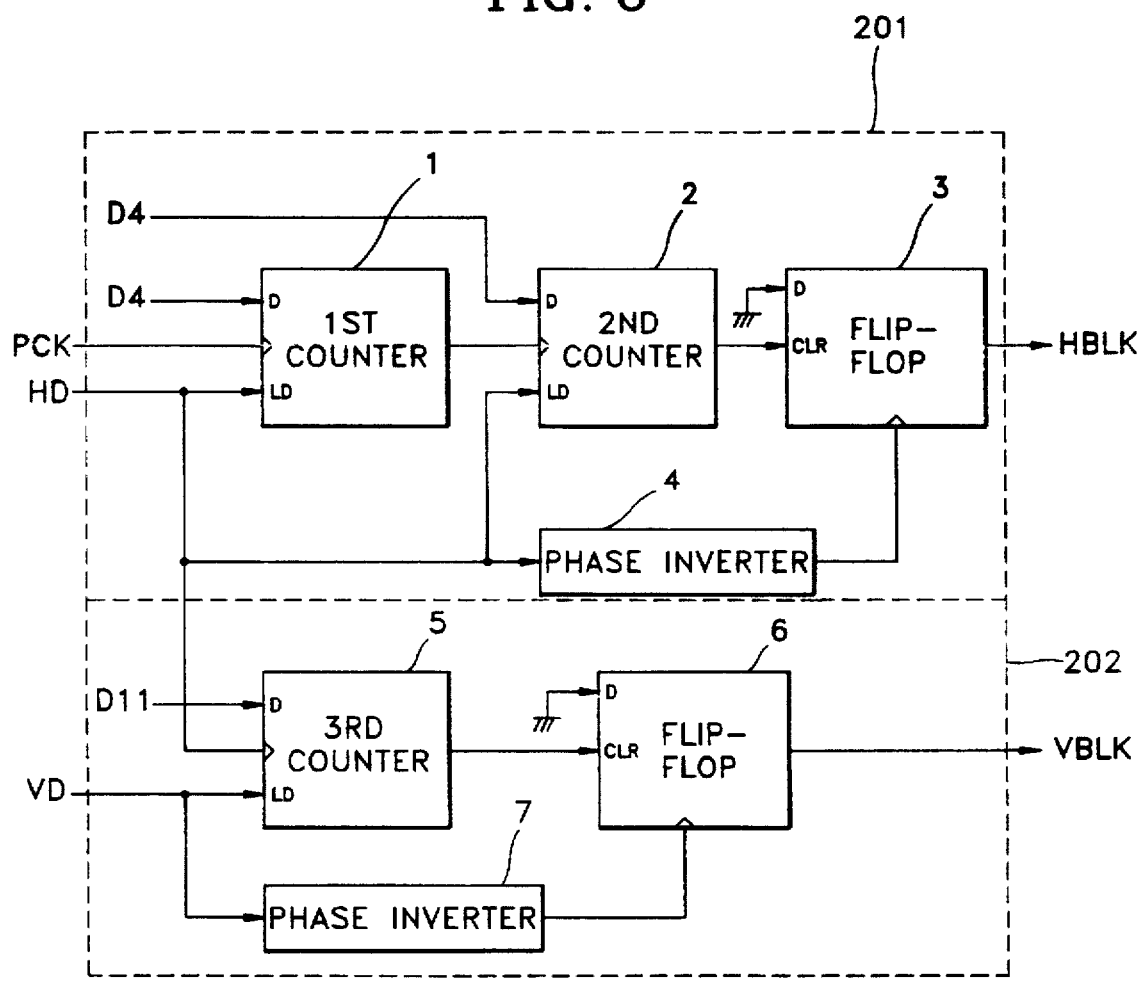
FIG. 6 is a block diagram of a video control signal generator according to an embodiment of the present invention.
Figure 7A:
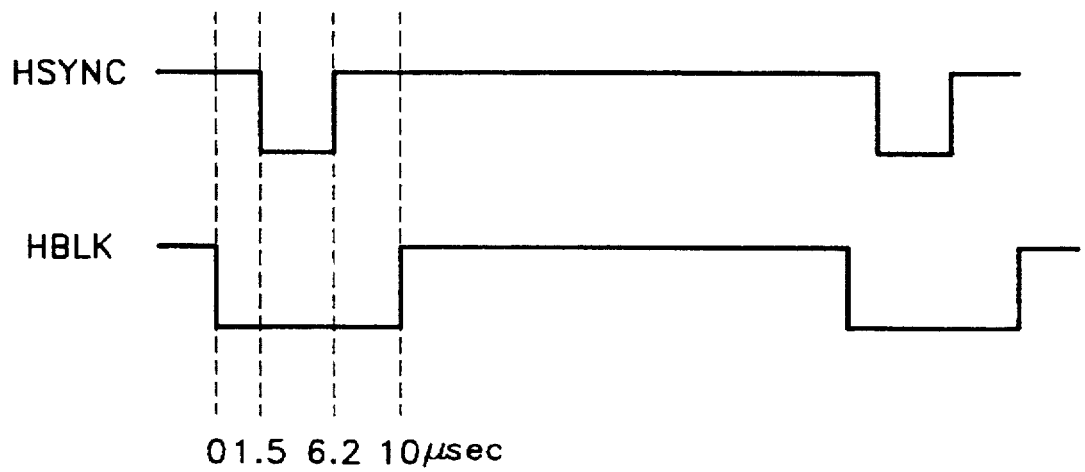
FIGS. 7A and 7B are a timing diagrams, for various signals associated with the conventional video signal processor of FIG. 1.
Figure 7B:
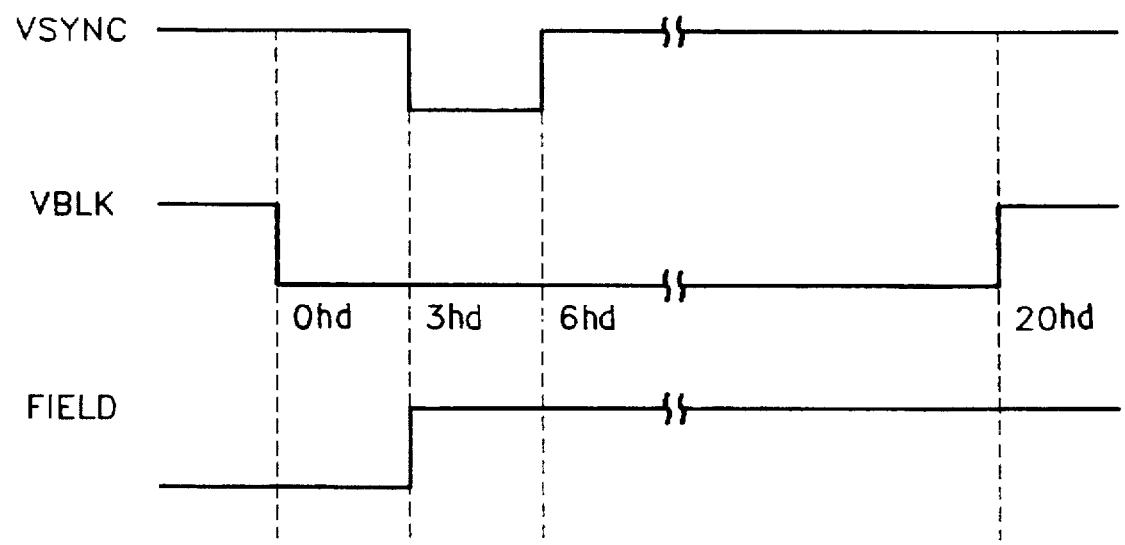

Referring to FIG. 6, according to the present invention, a video control signal generator, as embodied herein, includes a horizontal blanking signal generator 201 and a vertical 2) blanking signal generator 202, to generate the horizontal and vertical blanking signals HBLK and VBLK, as shown in FIGS. 7A and 7B. The horizontal blanking signal generator 201 includes first and second counters 1 and 2, a phase inverter 4, and a flip-flop 3. The vertical blanking signal generator 202 includes a third counter 5, a phase inverter 7, and a flipflop 6. The operation of the video control signal generator will be described with reference to FIGS. 8A and 8B.

Figure 8A:
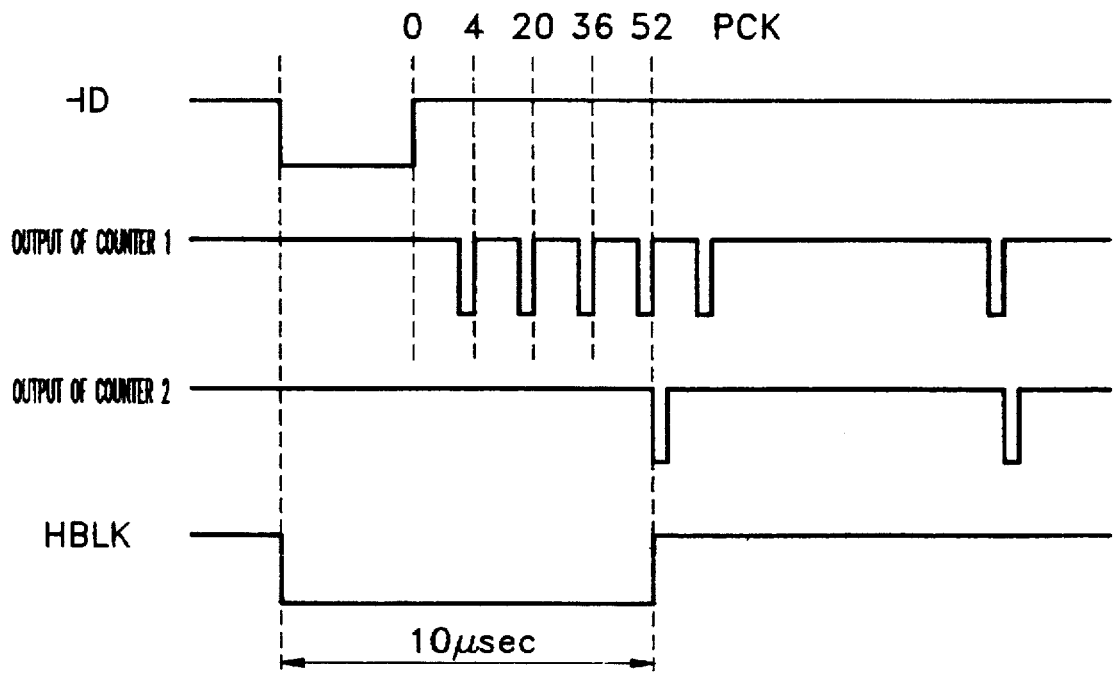
FIGS. 8A and 8B are a timing diagram for various signals associated with the video control signal generator of FIG. 6.
Figure 8B:
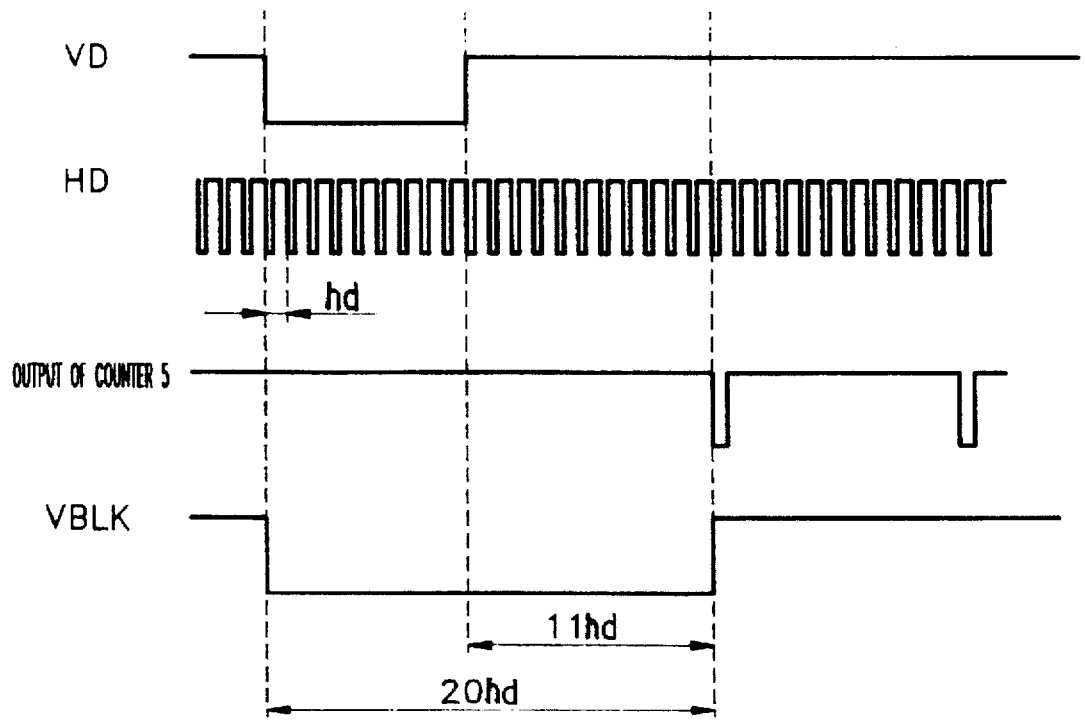

FIG. 8A is a timing diagram for various signals associated with generating the horizontal blanking signal HBLK from the horizontal driving signal HD by the video control signal generator of FIG. 6; and FIG. 8B is a timing diagram for various signals associated with generating the vertical blanking signal VBLK from the vertical driving signal VD by the video control signal generator of FIG. 6.

In the horizontal blanking signal HBLK (shown in FIG. 7A,) the 10 µsec time period during which a negative signal is present corresponds to the time interval of the horizontal sync signal HSYNC. Similarly, in the vertical blanking signal VBLK (shown in FIG. 7B), during the vertical blanking period (i.e., 0~20 hd time duration as show in FIG. 7B), twenty(20) horizontal driving signals(each having a HD time period) are generated in time relation with the time interval of the vertical sync signal VSYNC. 1 $T_{HD}$ may refer to a 63.5 µsec pulse width of the horizontal driving signal HD based on the NTSC standard.

Figure 1:
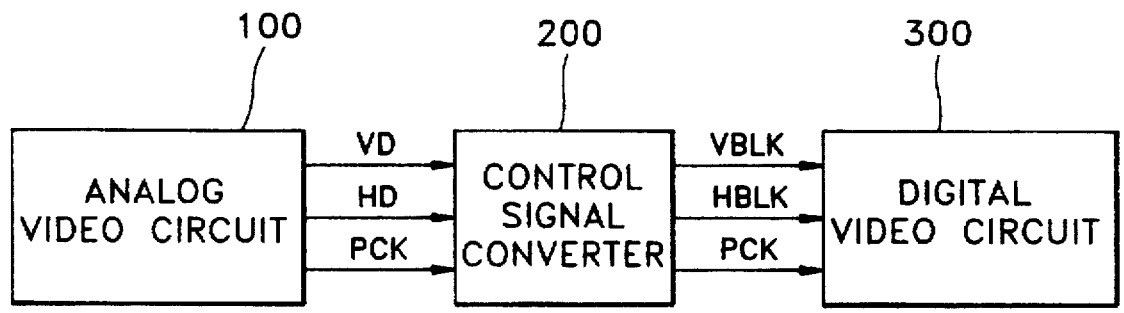
FIG. 1 is a block diagram of a conventional video signal processor.
Figure 2:
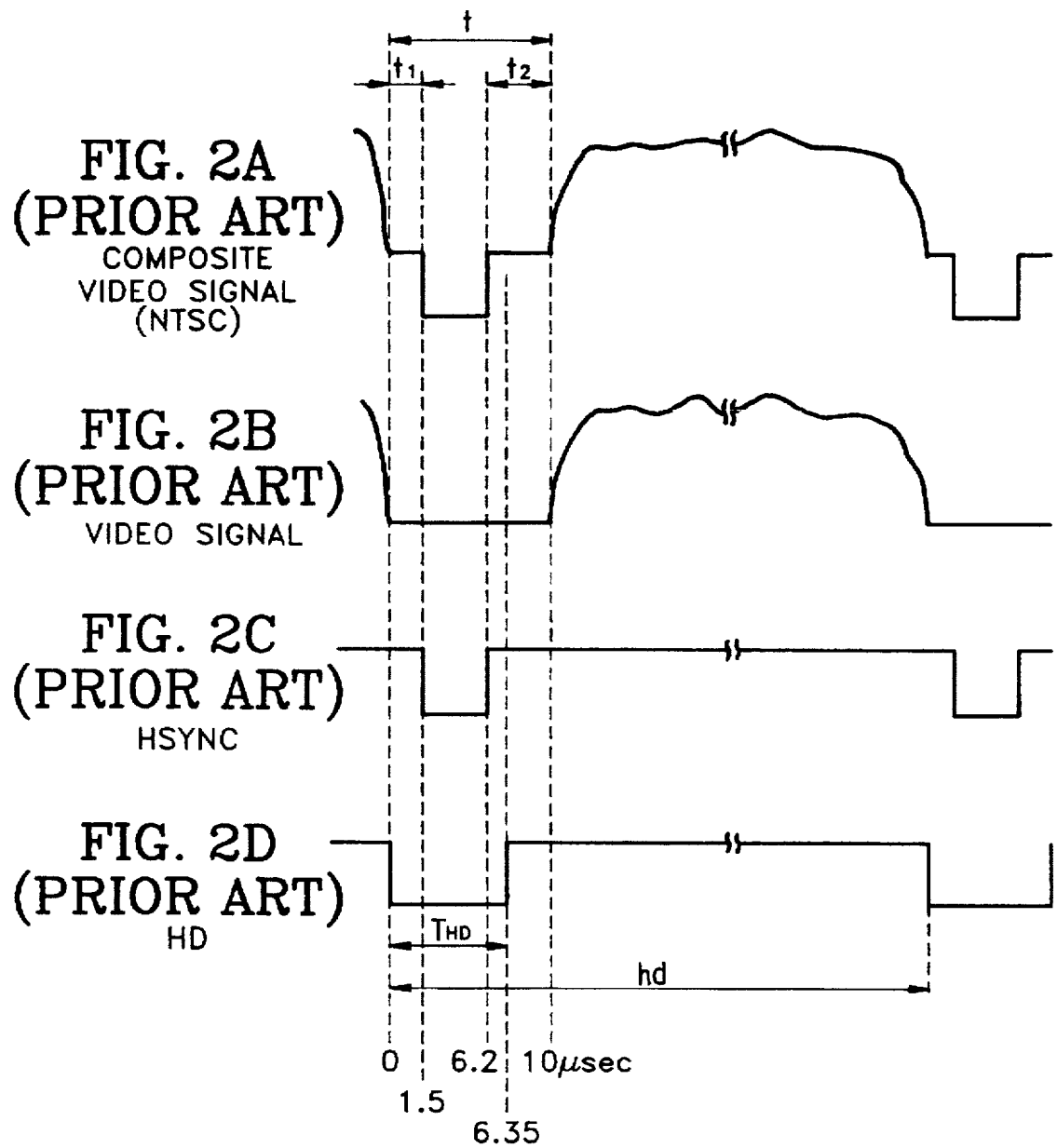
FIGS. 2A–2D and FIGS. 3A–3C constitute a timing diagram for signals processed in the conventional video signal processor of FIG. 1.
Figure 3:
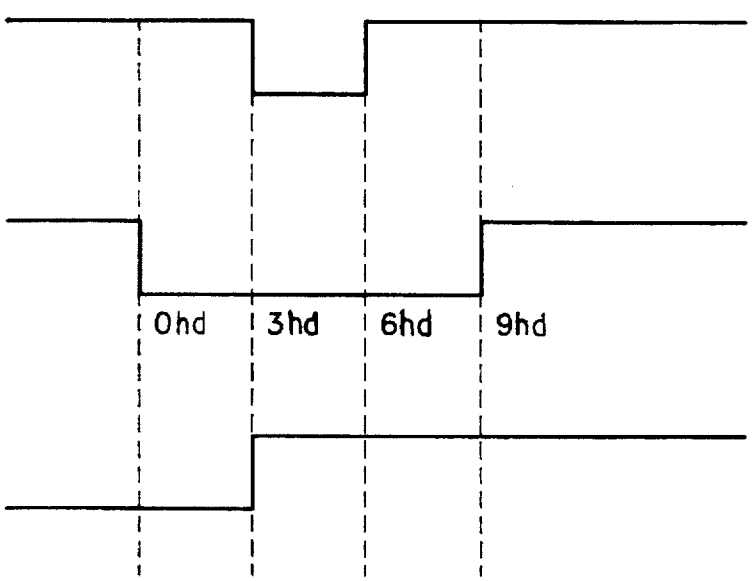
Figure 4:
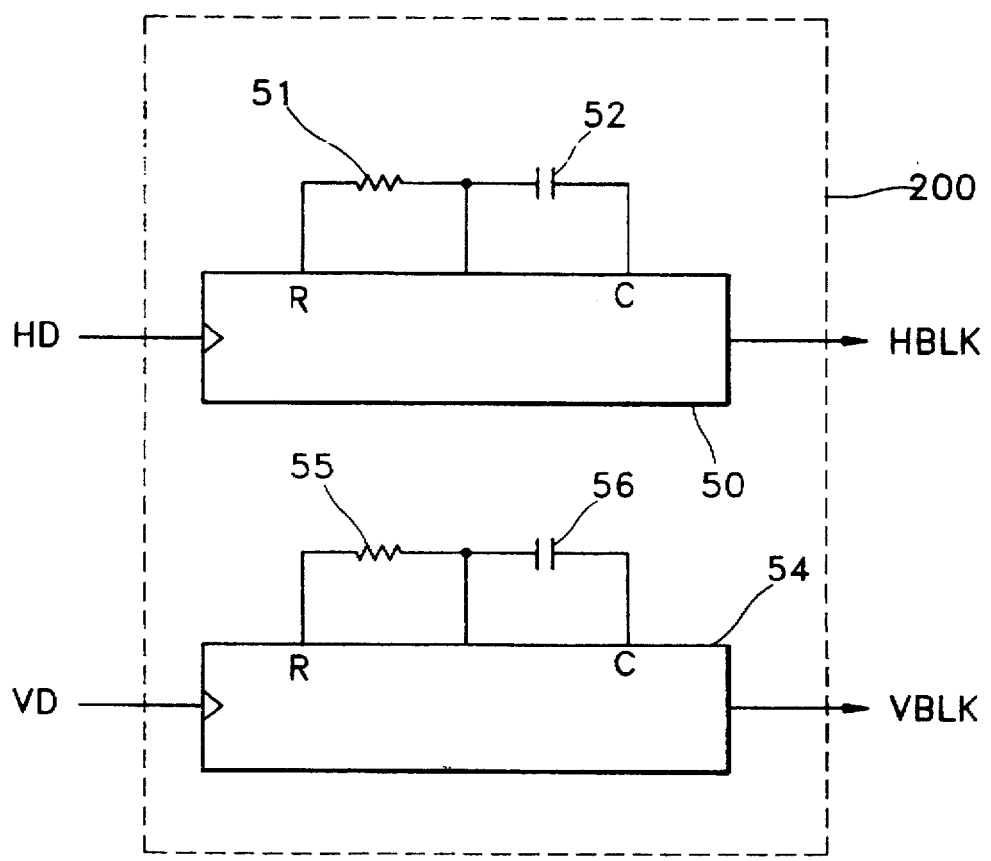
FIG. 4 is a circuit diagram of the control signal converter of the conventional video control signal processor of FIG. 1.
Figure 5A:
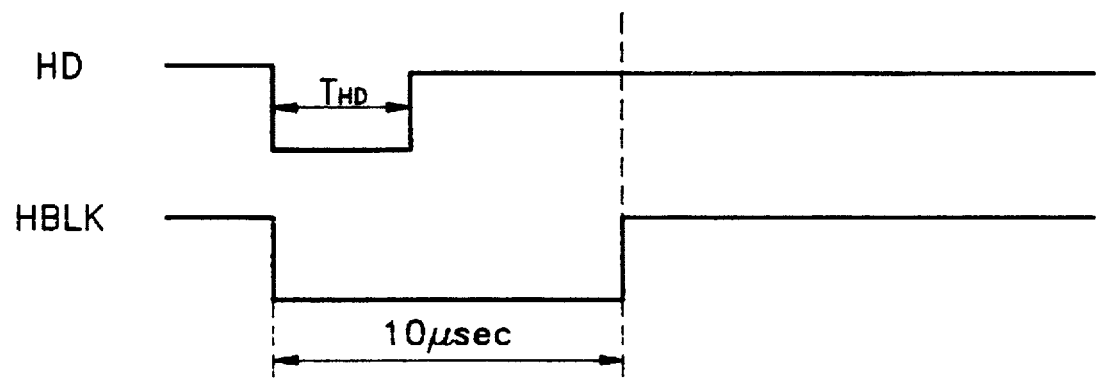
FIGS. 5A and 5B are a timing diagram for the horizontal and vertical blanking signals associated with the control signal converter of FIG. 4.
Figure 5B:
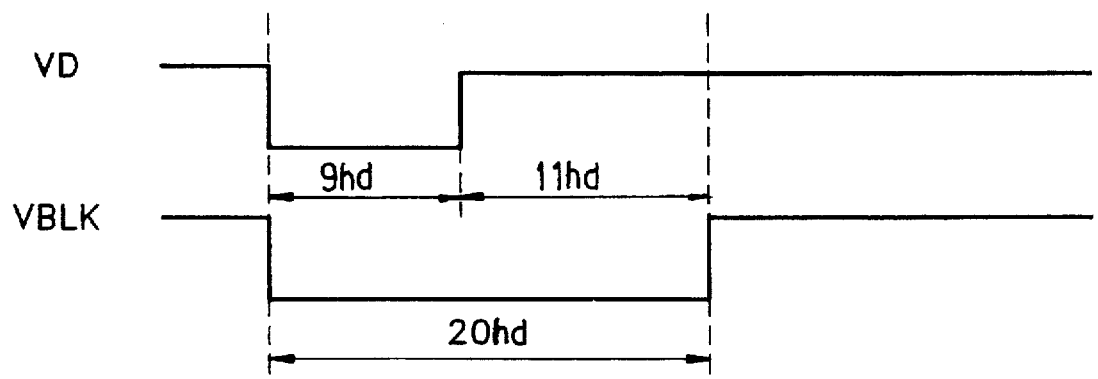

Referring to FIG. 6, a pixel clock pulse PCK, the horizontal driving signal HD and the vertical driving signal VD are provided from the analog video circuit 100 shown in FIG. 1. The first and second counters 1 and 2, as embodied herein, are initialized to a value "4" by D4 signals provided to data input ports D thereof. Similarly, the third counter 5 is initialized to a value "11" by a D11 signal provided to a data input port D thereof.

When an input signal (i.e., the horizontal driving signal HD shown in FIG. 8A) is provided to load ports LD of the first and second counters 1 and 2 (see FIG. 6), if the input signal has a "low" logic value, the counters 1 and 2 are initialized to a value "4". When the input signal HD has a "high" logic value, the first counter 1 down-counts, i.e., 4–3–2–1–0. When down-counted to a zero "0", the first counter 1 produces a pulse and provides it co the clock port of the second counter 2. Then, the first counter 1 is reset to a value "15", synchronized with its pixel clock pulse PCK, and commences a down-count operation. When the counted value becomes a zero, the first counter 1 provides a pulse to the clock port of the second counter 2.

The second counter 2 generates a pulse during the time period corresponding to the first four pixel clock pulses provided from the first counter 1, and then gene-rates a pulse every sixteen clock pulses provided from the first counter 1. Only the first one of the pulses generated from the second counter 2 (which is provided to a clear port CLR of the flip-flop 3 shown in FIG. 6) is needed to generate a video signal control signal.

The phase inverter 4 inverts the phase of the horizontal driving signal HD, and provides the inverted horizontal driving signal HD to the flip-flop 3 via its clock port. With a data input port D of the flip-flop 3 grounded (tied to a logic "low" signal), when a logic "high" signal from the phase inverter 4 is provided to the clock port of the flip-flop 3, the flip-flop 3 is cleared by the pulse provided from the counter 2, causing its output HBLK to go "high". The above-described operations are continuously performed to output the horizontal blanking signal HBLK for subsequent horizontal driving signals HD.

The "low" time interval (having the logic "low") of the vertical driving signal VD, which is provided to the third counter 5 (FIG. 6), is maintained for a time duration of 9 hd. If the vertical driving signal VD is provided to a load port LD of the third counter 5, the third counter 5 is initialized to a value "11" by the signal D11. In this situation, if the vertical driving signal VD has the logic "low" , since the third counter 5 outputs the "low" signal and consequently the flip-flop 6 cannot be cleared; and the vertical driving signal VD having the logic "high" is inverted by the phase inverter 7 and then provided to the clock port of the flip-flop 6, the flip-flop 6 outputs the "low" signal received from the data input port D, via its output port. Meanwhile, when the vertical driving signal VD goes "high", the phase inverter 7 outputs an inverted logic "low" signal to the clock port of the flip-flop 6, and the flip-flop 6 outputs the vertical blanking signal VBLK having the logic "low".

When the vertical driving signal VD goes "high", the third counter 5 down-counts in the sequence of 11–10–9–8–7–6–5–4–3–2–1–0. When the counted value becomes a zero, a logic "low" pulse is generated (FIG. 8B) from the third counter 5, and applied to the clear port (LR) of the flip-flop 6. Accordingly, when the logic "low" pulse, which is generated in the third counter 5 for each eleven-counts after the vertical driving signal VD goes "high", is provided to the clear port CLR of the flip-flop 6, the flip-flop 6 is cleared to output the logic "high" signal. The above-described operations are continuously performed to output the vertical blanking signal VBLK for subsequent vertical driving signals VD.

The aforementioned blanking signal processing operation is performed in synchronization with the horizontal and vertical driving signals HD and VD and the pixel clock pulse PCK provided from the analog video circuit 100 of (FIG. 1). Thus, the video control signal, as embodied therein, experiences no phase deviation or pulse width variation, as in the conventional; video signal processor. In other words, the horizontal and vertical blanking signals having a precise time interval are produced, to be used as the video control signal. The pixel clock pulse, as embodied herein, is preferably a 14.31818 MHz pulse in accordance with the NTSC standard.

Now, another embodiment of the present invention will be described. The explanation hitherto has been made based on the NTSC standard, i.e., the counters 1, 2, and 5 are set at a value based on a $1T_{HD}$ (6.35 µsec) and 9 hd for the horizontal and vertical driving signals HD and VD, respectively. However, if the pulse width of the horizontal driving signal HD is not 6.35 µsec, the count value of the first and second counters 1 and 2 is set by the following equation:

$$\{(10-T_{HD})/(1/14,318,180)\}/16=N_1 \cdot N_2 \tag{1}$$

where $T_{HD}$ represents the pulse width of the horizontal driving signal HD in microseconds, and $N_1$ represents a quotient. The value obtained by adding one to $N_1$, i.e., $N_1+1$ is set as the value of the second counter 2. $N_2$ represents a remainder which is set as the value of the first counter 1.

Also, the initial value of the third counter 5 is set according to the pulse width of the vertical driving signal VD and obtained by the following equation:

$$20 - T_{VD} = N5 \quad (2)$$

where $T_{VD}$ represents the pulse width of the vertical driving signal VD in the unit of $T_{HD}$ (the pulse width of the horizontal driving signal HD), and N5 is the value set for the third counter 5 in the unit of $T_{HD}$.

In yet another embodiment of the present invention, the above equation (1) can be applied to a video control signal generator adopting the PAL standard, by replacing "1/14, 318,180" with "1/17,734,000" (for 17.734 MHz).

As described above, the video control signal generator of the present invention, as embodied above, does not employ a multivibrator, resistor, or capacitor, and, instead, employs a counter, phase inverter, and flip-flop. Therefore, no variations in oscillation frequencies due to temperature changes occur so that the video control signal can be generated with a precise time interval. Further, adjustments to compensate for characteristic differences from components to components would not be required. The video control signal of the present invention has a precise time interval by counting the pixel clock pulses and the pulses associated with the horizontal and vertical driving signals provided from the conventional analog video circuits.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A system for generating a video control signal to process a video signal associated with a video composite signal, said video composite signal having a horizontal driving signal and a vertical driving signal, each of said driving signals having one or more pulses, said system comprising:

a counter for counting said pulses of one of said horizontal and vertical driving signals; and a flip-flop, coupled to said counter, for generating a blanking signal based on the the pulse count in said counter; and an inverter for inverting the phase of a respective one of said horizontal and vertical driving signals to generate an inverted driving signal, wherein said flip-flop includes means, coupled to said inverter, for generating said blanking signal at least partially based on said inverted driving signal.

2. The system for generating a video control signal of claim 1, wherein said counter includes a first counter for counting said pulses in said horizontal driving signal, and a second counter for counting said pulses in said vertical driving signal, and wherein said inverter includes a first inverter for inverting the phase of said horizontal driving signal and a second inverter for inverting the phase of said vertical driving signal, and wherein said flip-flop includes a first flip-flop, coupled to said first counter, for generating a horizontal blanking signal based on the pulse count in said first counter, and a second flip-flop, coupled to said second counter, for generating a vertical blanking signal based on said pulse count in said second counter.

3. The system for generating a video control signal of claim 1, wherein said counter includes means for counting said pulses in reference to a timing of a pixel clock pulse.

4. The system for generating a video control signal of claim 1, wherein the pulse widths of said horizontal and vertical driving signals are 6.35 μsec and 9 hd, respectively, where hd refers to a time period representing a cycle of the horizontal driving signal.

5. The system for generating a video control signal of claim 1, wherein said inverter includes a first inverter for inverting the phase of said horizontal driving signal and a second inverter for inverting the phase of said vertical driving signal, and wherein said flip-flop includes a first flip-flop, coupled to said first inverter, for generating a horizontal blanking signal, and a second flip-flop, coupled to said second inverter, for generating a vertical blanking signal.

6. The system for generating a video control signal of claim 2, wherein said first counter includes two counting means having a relationship expressed as:

$$\{(10 - T_{HD})/(1/14318180)\}/16 = N_1 \cdot N_2$$

where $T_{HD}$ represents the pulse width of said horizontal driving signal in microseconds; $N_1$ represents a quotient, to which one is added to obtain a value $N_1 + 1$ which is set as an initial value of one of said two counting means; and $N_2$ represents a remainder which is set as an initial value of the other counting means, if an input video signal is an NTSC standard and the pulse width of said horizontal driving signal is not 6.35 μsec.

7. The system for generating a video control signal of claim 2, wherein an initial count of said second counter is obtained by the following equation:

$$20 - T_{VD} = N5$$

where $T_{VD}$ represents the pulse width of the vertical driving signal in the time unit of the pulse width of said horizontal driving signal, and N5 is an initial value set for said second counter in the time unit of the pulse width of said horizontal driving signal.

8. The system for generating a video control signal of claim 2, wherein said first counter includes two counting means having a relationship expressed as:

$$\{(10 - T_{HD})/(1/17734000)\}/16 = N_1 \cdot N_2$$

where $T_{HD}$ represents the pulse width of said horizontal driving signal in microseconds; $N_1$ represents a quotient, to which one is added to obtain a value $N_1 + 1$ which is set as an initial value of one of said two counting means; and $N_2$ represents a remainder which is set as an initial value of the other counting means, if an input video signal is an PAL standard and the pulse width of said horizontal driving signal is not 6.35 μsec.

9. The system for generating a video control signal of claim 2, wherein said counter includes means for counting said pulses in reference to a timing of pixel clock pulse.

10. The system for generating a video control signal of claim 2, wherein pulse widths of said horizontal and vertical driving signals are 6.35 μsec and 9 hd, respectively, where hd refers to a time period representing a cycle of the horizontal driving signal.

* * * * *